US008411806B1

(12) United States Patent
Lee et al.

(10) Patent No.: US 8,411,806 B1
(45) Date of Patent: Apr. 2, 2013

(54) METHOD AND APPARATUS FOR RECEIVING SIGNALS IN A MIMO SYSTEM WITH MULTIPLE CHANNEL ENCODERS

(75) Inventors: Jungwon Lee, Cupertino, CA (US);
Hui-Ling Lou, Sunnyvale, CA (US)

(73) Assignee: Marvell International Ltd., Hamilton (BE)

( * ) Notice: Subject to any disclaimer, the term of this patent is extended or adjusted under 35 U.S.C. 154(b) by 680 days.

(21) Appl. No.: 12/543,363

(22) Filed: Aug. 18, 2009

Related U.S. Application Data

(60) Provisional application No. 61/093,863, filed on Sep. 3, 2008.

(51) Int. Cl.
*H04L 27/06* (2006.01)

(52) U.S. Cl. ........ 375/341; 375/362; 375/340; 375/347; 375/349; 375/350

(58) Field of Classification Search .......... 375/259–262, 375/316, 340–341, 346–350
See application file for complete search history.

(56) References Cited

U.S. PATENT DOCUMENTS

| | | | |
|---|---|---|---|
| 8,135,098 B2 | 3/2012 | Lee et al. | |
| 2002/0150187 A1 | 10/2002 | Chugg et al. | |
| 2005/0025039 A1 | 2/2005 | Hwang et al. | |
| 2005/0053172 A1* | 3/2005 | Heikkila | 375/333 |
| 2005/0101259 A1 | 5/2005 | Tong et al. | |
| 2005/0201478 A1* | 9/2005 | Claussen et al. | 375/261 |
| 2005/0286462 A1 | 12/2005 | Roh et al. | |
| 2006/0198460 A1* | 9/2006 | Airy et al. | 375/267 |
| 2006/0269023 A1 | 11/2006 | Chimitt et al. | |
| 2007/0135125 A1 | 6/2007 | Kim et al. | |
| 2007/0165737 A1 | 7/2007 | Sarrigeorgidis | |
| 2007/0183541 A1* | 8/2007 | Moorti et al. | 375/341 |
| 2007/0211813 A1 | 9/2007 | Talwar et al. | |
| 2007/0230608 A1 | 10/2007 | Li | |
| 2008/0025442 A1 | 1/2008 | Hwang et al. | |
| 2008/0239938 A1 | 10/2008 | Jalloul et al. | |

FOREIGN PATENT DOCUMENTS

WO  WO-2006/056836 A1  6/2006

OTHER PUBLICATIONS

IEEE Std 802.16-2004 (Revision of IEEE Std 802.16-2001), "IEEE Standard for Local and metropolitan area networks; Part 16: Air Interface for Fixed Broadband Wireless Access Systems," *The Institute of Electrical and Electronics Engineers, Inc.*, Oct. 1, 2004; 893 pages.

IEEE Std 802.11g/D8.2, Apr. 2003 (Supplement to ANSI/IEEE Std 802.11, 1999 (Reaff 2003)) "Draft Supplement to Standard [for] Information technology-Telecommunications and information exchange between systems-Local and metropolitan area networks-Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

S. A. Mujtaba, "IEEE P802.11—Wireless LANs, TGn Sync Proposal Technical Specification," *The Institute of Electrical and Electronics Engineers, Inc.*, doc.: IEEE 802.11—04/0889r6, May 2005.

(Continued)

*Primary Examiner* — David C. Payne
*Assistant Examiner* — James M Perez

(57) ABSTRACT

In a method for decoding plurality of information streams corresponding to a plurality of layers, where the plurality of information streams have been transmitted via a multiple input multiple output (MIMO) communication channel, a plurality of received signals are processed to decode information corresponding to a first layer. A plurality of modified received signals are generated using the decoded information corresponding to the first layer and the plurality of received signals. Bit metric values are generated for a second layer using MIMO maximum likelihood (ML) demodulation and using the plurality of modified received signals and channel and modulation information for interfering signals. Information corresponding to the second layer is decoded using the generated bit metric values.

21 Claims, 8 Drawing Sheets

OTHER PUBLICATIONS

IEEE Std 802.16a-2003 (Amendment to IEEE Std 802.16-2001) "IEEE Standard for Local and metropolitan area networks: Part 16: Air Interface for Fixed Broadband Wireless Access Systems-Amendment 2: Medium Access Control Modifications and Additional Physical Layer Specifications for 2-11 GHZ," *The Institute of Electrical and Electronics Engineers, Inc.*, Apr. 1, 2003.

IEEE Std 802,11 a-1999 (Supplement to IEEE Std 802.11-1999) • Supplement to IEEE Standard for Information technology—Telecommunications and information exchange between systems Local and metropolitan area networks—Specific requirements—Part 11: Wireless LAN Medium Access Control (MAC) and Physical Layer (PHY) specifications: High-Speed Physical Layer in the 5 GHZ Band. *The Institute of Electrical and Electronics Engineers. Inc.* (1999).

IEEE Std 802.11 b-1999 (Supplement to ANSI/IEEE Std 802.11. 1999 Edition) "Supplement to IEEE Standard for Information technology—Telecommunications and information exchange between systems-Local and metropolitan area networks-Specific requirements Part 11 : Wireless LAN Medium Access Control (MAC) and Physical Layer (PHY) specifications: Higher-speed Physical Layer Extension in the 2.4 GHZ Band." *The Institute of Electrical and Electronics Engineers. Inc.* 1999.

Zheng et al.. "Link Performance Abstraction for ML Receivers based on RBIR Metrics", IEEE 802.16 Broadband Wireless Access Working Group, Sep. 10, 2007.

U.S. Appl. No. 12/171,790, entitled "Co-Channel Interference Cancellation with Multiple Receive Antennas for BICM", filed Jul. 11, 2008.

IEEE Std 802.11b-2001 (Corrigendum to IEEE Std 802.11b-1999) "IEEE Standard for Information technology—Telecommunications and information exchange between systems-Local and metropolitan area networks-Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

Lee et al., U.S. Appl. No. 12/207,350, entitled "MIMO Decoding in the Presence of Various Interfering Sources," filed Sep. 9, 2008.

"IEEE P802.11n™/D3.00, Draft Standard for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

"IEEE Std. 802.11n™ IEEE Standard for Information Technology-Telecommunications and information exchange between systems-Local and metropolitan area networks-Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

\* cited by examiner

METHOD AND APPARATUS FOR RECEIVING SIGNALS IN A MIMO SYSTEM WITH MULTIPLE CHANNEL ENCODERS

CROSS REFERENCE TO RELATED APPLICATION

This application claims the benefit of U.S. Provisional Patent App. No. 61/093,863 entitled "High Performance Receiver for MEMO System with Multiple Channel Encoders," filed Sep. 3, 2008, the disclosure of which is hereby expressly incorporated herein by reference.

FIELD OF TECHNOLOGY

The present disclosure relates generally to Multiple-Input-Multiple-Output (MIMO) systems and, more particularly, to a receiver in a MIMO system with multiple encoders.

BACKGROUND

An ever-increasing number of relatively inexpensive, low power wireless data communication services, networks and devices have been made available over the past number of years, promising near wire speed transmission and reliability. Various wireless technology is described in detail in the Institute for Electrical and Electronics Engineers (IEEE) 802 Standards, including for example, the IEEE Standard 802.11a (1999) and its updates and amendments, the IEEE Standard 802.11g (2003), and the IEEE Standard 802.11n now in the process of being adopted, all of which are collectively incorporated herein fully by reference. These standards have been or are in the process of being commercialized with the promise of 54 Mbps or higher data rate, making them a strong competitor to traditional wired Ethernet and the more common "802.11b" or "WiFi" 11 Mbps mobile wireless transmission standard.

Some wireless communication systems utilize multiple transmit antennas and multiple receive antennas to increase the number of signals which may be propagated in the communication system and/or to compensate for deleterious effects associated with the various propagation paths, and to thereby improve transmission performance. Such a system is commonly referred to as a multiple-input, multiple-output (MIMO) wireless transmission system and is specifically provided for within the IEEE 802.11n Standard now being adopted. Further, the 802.16 standard, or WiMAX, applies to cell-based systems and supports MIMO techniques. Generally speaking, the use of MIMO technology produces significant increases in spectral efficiency and link reliability of wireless communication systems, and these benefits generally increase as the number of transmit and receive antennas within the MIMO system increases.

A MIMO channel formed by the various transmit and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. However, instead of using all of the various different transmit and receive antennas to form separate spatial channels on which additional information is sent, better transmission and reception properties can be obtained in a MIMO system by using at least some of the various transmit antennas of the MIMO system to transmit the same signal while phasing (and amplifying) this signal as it is provided to the various transmit antennas to achieve beamforming or beamsteering. Generally speaking, beamforming or beamsteering creates a spatial gain pattern having one or more high gain lobes or beams (as compared to the gain obtained by an omni-directional antenna) in one or more particular directions, while reducing the gain over that obtained by an omni-directional antenna in other directions. If the gain pattern is configured to produce a high gain lobe in the direction of each of the receive antennas, the MIMO system can obtain better transmission reliability between a particular transmitter and a particular receiver, over that obtained by single transmitter-antenna/receiver-antenna systems.

In some MIMO communication systems, multiple bit streams may be encoded for transmission via the MIMO channel using multiple channel encoders, and a single receiver may receive and decode the multiple encoded bit streams. For example, a single transmitter, such as within a user device or a base station, may include multiple channel encoders, and a single receiver may receive and decode the transmissions from the single transmitter. As another example, a plurality of transmitters, such as distributed among a plurality of user devices, may each include a channel encoder, and a single receiver, such as a base station, may receive and decode the transmissions from the plurality of transmitters.

FIG. 1 is a block diagram of a prior art MIMO receiver 100 for receiving and decoding transmissions from L channel encoders, where L is an integer greater than or equal to two. The receiver 100 receives R signals $y_1[m], y_2[m], \ldots, y_R[m]$, corresponding to R receive antennas, where R is an integer greater than or equal to L. The R signals $y_1[m], y_2[m], \ldots, y_R[m]$ carry information from S spatial streams, where $R \geq S \geq L$. A MIMO maximum likelihood (ML) demodulator 104 generally uses the R signals $y_1[m], y_2[m], \ldots, y_R[m]$ to generate a log likelihood ratio (LLR) indicating the likelihood that a bit is a zero and the likelihood that the bit is one, for each bit in each of the S spatial streams. For example, an LLR of zero may indicate an equal probability that the bit is a one or a zero. On the other hand, as the LLR increases in the positive direction, this may indicate increasing likelihood that the bit is a one. Similarly, as the LLR increases in the negative direction, this may indicate increasing likelihood that the bit is a zero. Thus, the output of the MIMO ML demodulator 104 is S signals, each signal comprising LLR values.

A spatial stream to layer de-mapper generally maps the S signals from the MIMO ML demodulator 104 corresponding to the S spatial streams to L signals corresponding to the L layers. The receiver 100 also includes a deinterleaver 112 and a decoder 116 for each layer. The deinterleaver 112 reverses a known bit interleaving process performed at the channel encoder. The decoder 116 generally uses the LLR values to decode the signal into a bit stream corresponding to the layer.

As is known, calculating the LLR of a given bit may require a calculation of $\|y-Hx\|^2$ for every constellation point in the constellation set in order to determine the smallest distance, where y is a vector corresponding to $y_1[m], y_2[m], \ldots, y_R[m]$, H is an estimate of the MIMO channel, x is a transmit signal vector candidate corresponding to y. Moreover, if there are multiple streams, a calculation of $\|y-Hx\|^2$ may be required for every constellation point for every stream. Therefore, if the receiver 100 receives S streams, for example, and each stream is represented by W bits and modulated using an M-QAM scheme (where M=2W), the receiving device 100 may need to perform M*S calculations of $\|y-Hx\|^2$ to demodulate the received S streams.

FIG. 2 is a block diagram of another prior art MIMO receiver 150 for receiving and decoding transmissions from L channel encoders. The MIMO receiver 150 includes L layer receivers 154 and L−1 interference cancellers 158. The first layer receiver 154a processes the R signals $y_1[m]$, $y_2[m], \ldots, y_R[m]$ to demodulate and decode the first layer signal. The first layer interference canceller 158a then re-encodes and re-modulates the output of the receiver 154a to estimate the components of $y_1[m], y_2[m], \ldots, y_R[m]$ due to the first layer information. Then, the interference canceller 158a subtracts the estimated components due to the first layer from $y_1[m], y_2[m], \ldots, y_R[m]$. Thus, the interference canceller 158a attempts to subtract out the interference of the first layer with respect to layers 2 through L.

The second layer receiver 154b processes the R signals output from the first interference canceller 158a to demodulate and decode the second layer signal. The second layer interference canceller 158b then re-encodes and re-modulates the output of the receiver 154b to estimate the components of $y_1[m], y_2[m], \ldots, y_R[m]$ due to the second layer information. Then, the interference canceller 158b subtracts the estimated components due to the second layer from the output of the first interference canceller 158a. Thus, the interference canceller 158b attempts to subtract out the interference of the second layer with respect to layers 3 through L. The same technique continues until the L-th layer receiver 154d processes the R signals output from the (L−1)-th interference canceller 158c to demodulate and decode the L-th layer signal.

FIG. 3 is a block diagram of a receiver 154 and an interference canceller 158 of FIG. 2, for an n-th layer. The receiver 154 comprises a MIMO linear equalizer 162 that receives R signals $y_1'[m], y_2'[m], \ldots, y_R'[m]$ from an interference canceller for the (n−1)-th layer. The MIMO linear equalizer 162 outputs $S_n$ signals corresponding to the $S_n$ spatial streams for the n-th layer. A demapper 166 generally demaps the $S_n$ signals into a single stream of modulated symbols corresponding to the n-th layer. An LLR calculator 170 calculates LLR values corresponding to the modulated symbols. A deinterleaver 174 reverses a known bit interleaving process performed at the channel encoder. A decoder 178 generally uses the LLR values to decode the signal into a bit stream corresponding to the n-th layer.

The interference canceller 158 includes an encoder 182, an interleaver 184, and a modulator 186 that generally attempt to recreate encoding, interleaving and modulation performed by the channel encoder at the transmitter. A mapper 188 maps the modulated symbols output by the modulator 186 into the $S_n$ spatial streams for the n-th layer. A mapper 190 maps the $S_n$ spatial streams to T transmit antenna signals. Thus, the mapper 188 and the mapper 190 attempt to recreate mapping functions performed at the transmitter. A matrix multiplier 192 multiplies the T signals by a MIMO channel estimate H. A subtractor 194 subtracts the output of the matrix multiplier 192 from the signals $y_1'[m], y_2'[m], \ldots, y_R'[m]$.

SUMMARY

In one embodiment, a method for decoding a plurality of information streams corresponding to a plurality of layers is disclosed, where the plurality of information streams have been transmitted via a multiple input multiple output (MIMO) communication channel. The method includes processing a plurality of received signals to decode information corresponding to a first layer, and generating a plurality of modified received signals using the decoded information corresponding to the first layer and the plurality of received signals. The method also includes generating bit metric values for a second layer using MIMO maximum likelihood (ML) demodulation and using the plurality of modified received signals and channel and modulation information for interfering signals. The method additionally includes decoding information corresponding to the second layer using the generated bit metric values.

The method optionally may include one or more of the following features. Generating the bit metric values for the second layer may comprise generating bit metric values corresponding to a plurality of spatial streams. The method may further include de-mapping the plurality of spatial streams to a single stream of bit metric values prior to decoding, de-interleaving the bit metric values prior to decoding, or pre-processing the plurality of modified received signals for space-time coding.

The method optionally may include performing a first matrix decomposition on a channel matrix, and preprocessing the plurality of received signals with information from the first matrix decomposition. The channel matrix may be pre-processed with information from the first matrix decomposition to generate a first modified channel matrix, wherein the plurality of modified received signals are generated using the first modified channel matrix. The method may further include performing a second matrix decomposition on the first modified channel matrix. The plurality of modified received signals may be preprocessed with information from the second matrix decomposition, and the first modified channel matrix may be processed with information from the second matrix decomposition to generate a second modified channel matrix, wherein the MIMO ML demodulation uses the second modified channel matrix.

In another embodiment, a successive interference cancellation receiver is disclosed. The successive interference cancellation receiver is for receiving a plurality of information streams transmitted via a multiple input multiple output (MIMO) communication channel, the plurality of information streams corresponding to a plurality of layers. The successive interference cancellation receiver comprises a first layer receiver to demodulate and decode a plurality of received signals to decode information corresponding to a first layer, and an interference canceller to cancel interference due to the first layer from the plurality of received signals to generate a plurality of modified received signals. Additionally, the successive interference cancellation receiver comprises a second layer receiver to demodulate and decode the plurality of modified received signals to decode information corresponding to a second layer, wherein the second receiver includes, and a MIMO maximum likelihood (ML) demodulator to generate bit metric values for the second layer using the plurality of modified received signals and channel and modulation information for interfering signals. Further, the successive interference cancellation receiver comprises a decoder to generate information corresponding to the second layer using the bit metric values.

The successive interference cancellation receiver optionally may include one or more of the following features. The second layer receiver may include a pre-processor for space-time coding. The second layer receiver may include a MIMO equalizer. The second receiver may include a spatial stream de-mapper to de-map the bit metric values. The second receiver may include a deinterleaver to deinterleave the bit metric values. The first receiver may include a MIMO ML demodulator to generate bit metric values for the first layer using the plurality of received signals and channel and modulation information for interfering signals, and a decoder to generate the information corresponding to the first layer using the bit metric values generated by the MIMO ML demodulator of the first receiver.

In yet another embodiment, another successive interference cancellation receiver is disclosed. The successive interference cancellation receiver is for receiving a plurality of information streams transmitted via a multiple input multiple output (MIMO) communication channel, the plurality of information streams corresponding to a plurality of layers. The successive interference cancellation receiver comprises a plurality of layer receivers, each layer receiver to demodulate and decode a respective plurality of input signals to obtain information corresponding to a respective one of the plurality of layers, and at least one interference canceller, each interference canceller to receive an output from a respective one of the plurality of layer receivers and to cancel interference from the plurality of input signals to the respective one of the plurality of layer receivers, the interference due to a respective one of the plurality of layers. At least one of the plurality of layer receivers includes a MIMO maximum likelihood (ML) demodulator to generate bit metric values for the respective layer using a plurality of signals generated from one of the interference cancellers and channel and modulation information for interfering signals, and a decoder to generate information corresponding to the respective layer using the bit metric values.

DETAILED DESCRIPTION

Figure 4:
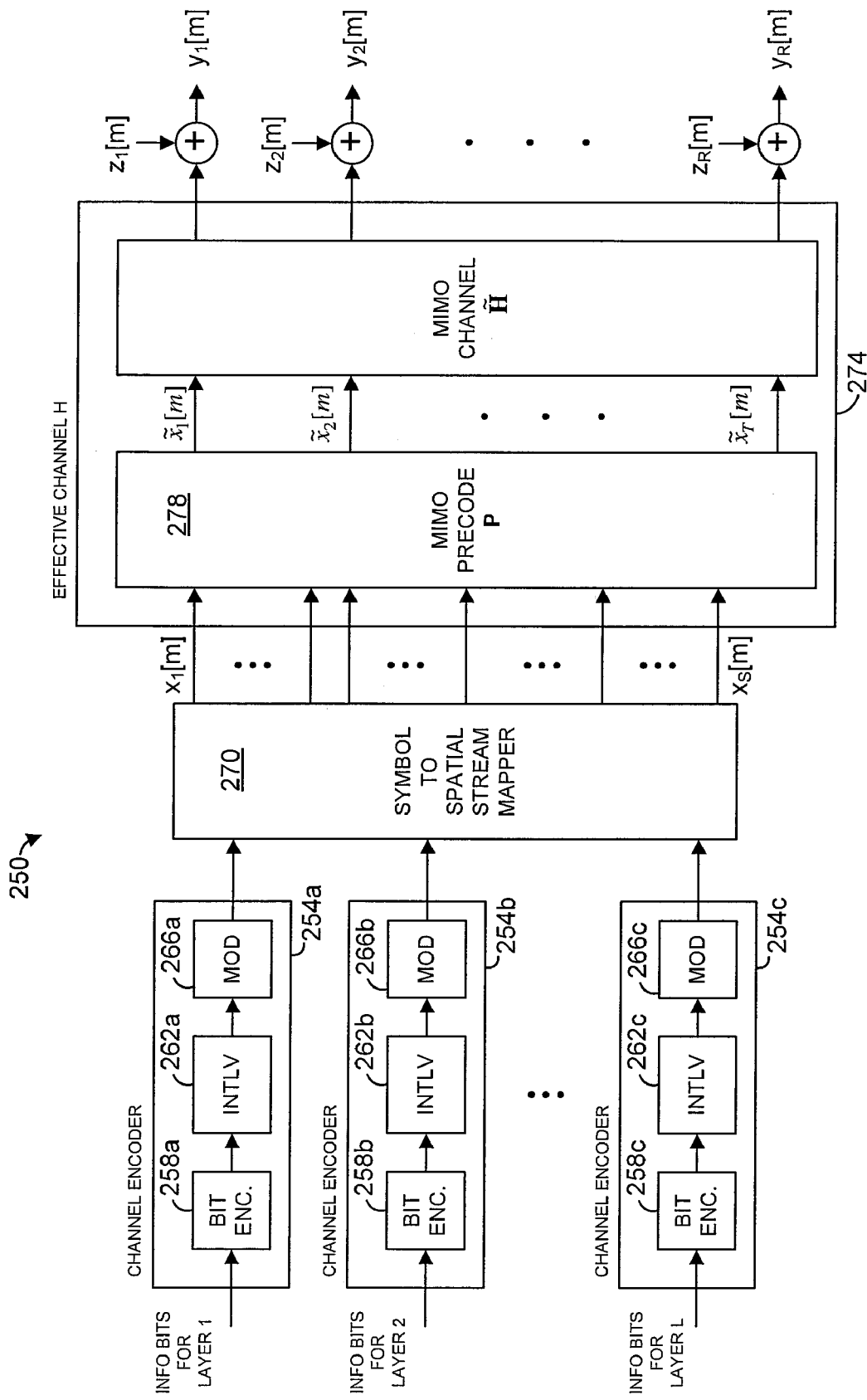
FIG. 4 is block diagram of an example model of a MIMO communication system employing multiple channel encoders.

FIG. 4 is a block diagram of a model 250 of a MIMO transmission system that includes L channel encoders 254, where L is an integer greater than or equal to two. The L channel encoders 254 may be included within a single transmitter, such as within a user device or a base station, or distributed among a plurality of transmitters such as among a plurality of user devices. Each channel encoder 254 receives a bit stream corresponding to one of the L layers and encodes the bit stream into a stream of channel symbols such as quadrature amplitude modulation (QAM) symbols, phase shift keying (PSK) symbols, etc. Each bit stream may be referred to as a layer, and thus the model 250 includes L layers. Each channel encoder 254 may include a bit encoder 258, an interleaver 262, and a modulator 266. The bit encoder 258 generally applies an encoding process to the information bits. The encoding process may be a forward error correction encoding process, for example. The interleaver 262 applies an interleaving process to the output of the bit encoder 258. The interleaving process 262 may help to mitigate burst errors, for example. The modulator 266 modulates the bit stream output of the interleaver 262 to generate modulated symbols. Any suitable modulation technique, including known modulating techniques, may be utilized. For example, QAM, M-QAM, PSK, binary PSK (BPSK), amplitude modulation, frequency shift keying (FSK), etc., may be utilized.

A mapping unit 270 generally maps each output of the channel encoders 254 to one or more spatial streams, to generate a total number of S spatial streams, $x_1[m]$, $x_2[m], \ldots, x_S[m]$, where m is a time index. Alternatively, m may represent a frequency index or any transmission opportunity. In particular, mapping unit 270 maps the output of the n-th channel encoder 254 to $S_n$ spatial streams, where $$\sum_{n=1}^{L} S_n = S.$$

In other words, the mapping unit 270 maps modulated symbols to spatial streams. The mapping unit 270 may be modeled as matrix multiplication.

The spatial streams are provided to an effective MIMO channel H (274). The effective channel 274 includes a MIMO precoding block 278 that maps the S spatial streams to T transmit signals $\tilde{x}_1[m], \tilde{x}_2[m], \ldots, \tilde{x}_T[m]$, where T is a number of transmit antennas. The MIMO precoding block 278 may be modeled as a matrix P. The T transmit signals are transmitted via a MIMO channel $\tilde{H}$ (282). The received signals, $y_1[m]$, $y_2[m], \ldots, y_R[m]$, where R is a number of receive antennas, may be modeled as the output of the effective channel 274 with additive noise such as circularly symmetric Gaussian noise:

$$y = Hx + z, \quad \text{(Equation 1)}$$

where $$y = \begin{bmatrix} y_1 \\ y_2 \\ \vdots \\ y_R \end{bmatrix} \quad H = \begin{bmatrix} h_{1,1} & h_{1,2} & \ldots & h_{1,S} \\ h_{2,1} & h_{1,2} & \ldots & h_{2,S} \\ \vdots & \vdots & \vdots & \vdots \\ h_{R,1} & h_{R,2} & \ldots & h_{R,S} \end{bmatrix} \quad x = \begin{bmatrix} x_1 \\ x_2 \\ \vdots \\ x_S \end{bmatrix} \quad z = \begin{bmatrix} z_1 \\ z_2 \\ \vdots \\ z_R \end{bmatrix},$$

in which y represents, in vector form, the received signals $y_1[m], y_2[m], \ldots, y_R[m]$, H represents the effective MIMO communication channel 274, x represents the spatial streams $x_1[m], x_2[m], \ldots, x_S[m]$, and z represents the additive noise $z_1[m], z_2[m], \ldots, z_R[m]$ (the time index m has been omitted for notational convenience). In most cases, the model may assume L≦S, S≦T, and S≦R. For super-position coding, however, it may be assumed that L>S.

Equation 1 can be rewritten as:

$$y = Hx + z = \sum_{i=1}^{L} H_i x_i + z, \quad \text{(Equation 2)}$$

where $$H_i = \begin{bmatrix} h_{1,1,i} & h_{1,2,i} & \ldots & h_{1,S_i,i} \\ h_{2,1,i} & h_{1,2,i} & \ldots & h_{2,S_i,i} \\ \vdots & \vdots & \vdots & \vdots \\ h_{R,1,i} & h_{R,2,i} & \ldots & h_{R,S_i,i} \end{bmatrix} \quad x_i = \begin{bmatrix} x_{1,i} \\ x_{2,i} \\ \vdots \\ x_{S_i,i} \end{bmatrix},$$

in which $x_i$ represents the spatial streams corresponding to the i-th layer, $S_i$ is the number of spatial streams corresponding to the i-th layer, and $H_i$ is a matrix representing the effective MIMO communication channel for the spatial streams corresponding to the i-th layer.

Figure 1:
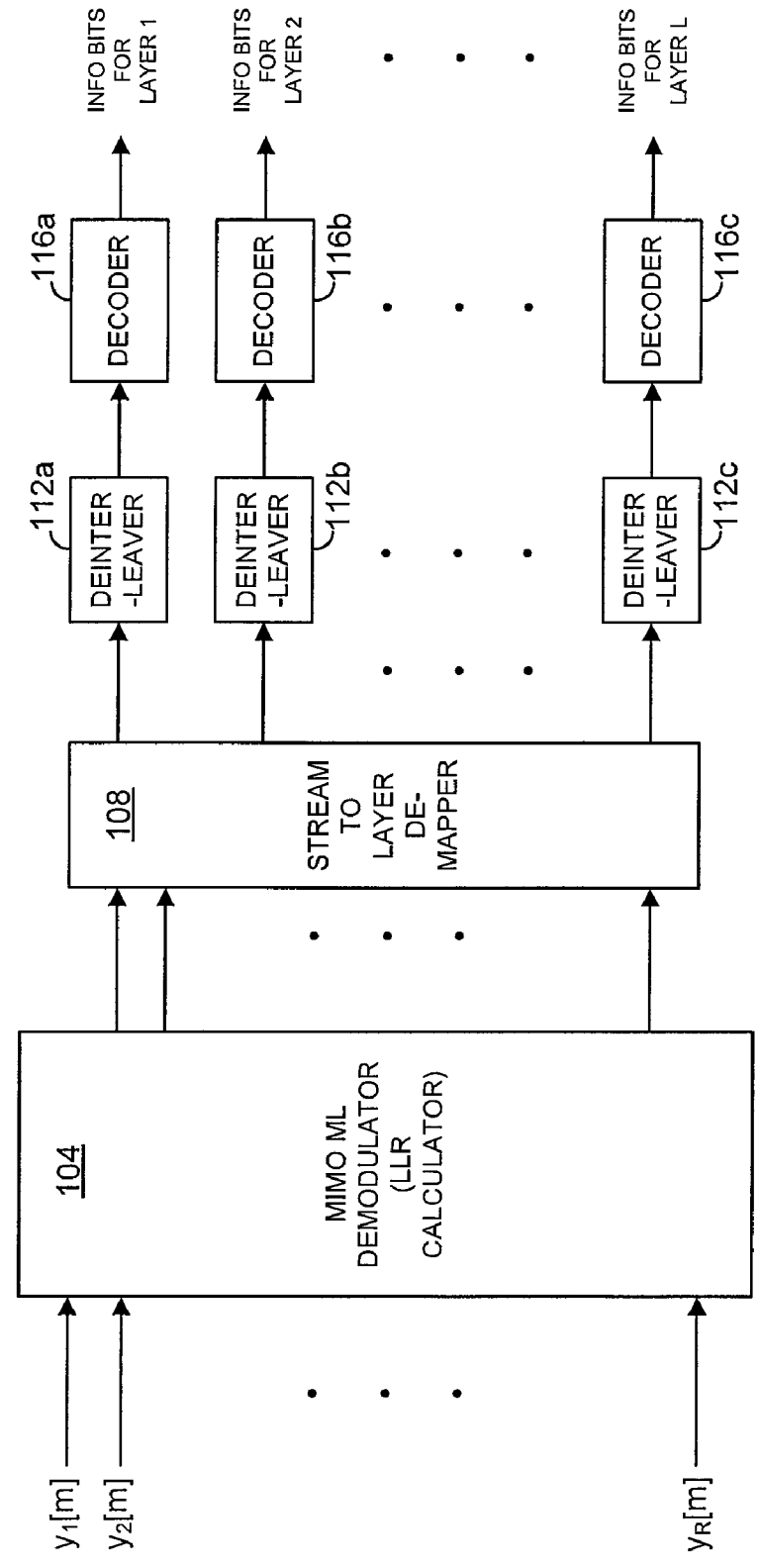
FIG. 1 is a block diagram of a prior art multiple-input, multiple-output (MIMO) maximum likelihood (ML) receiver.
Figure 2:
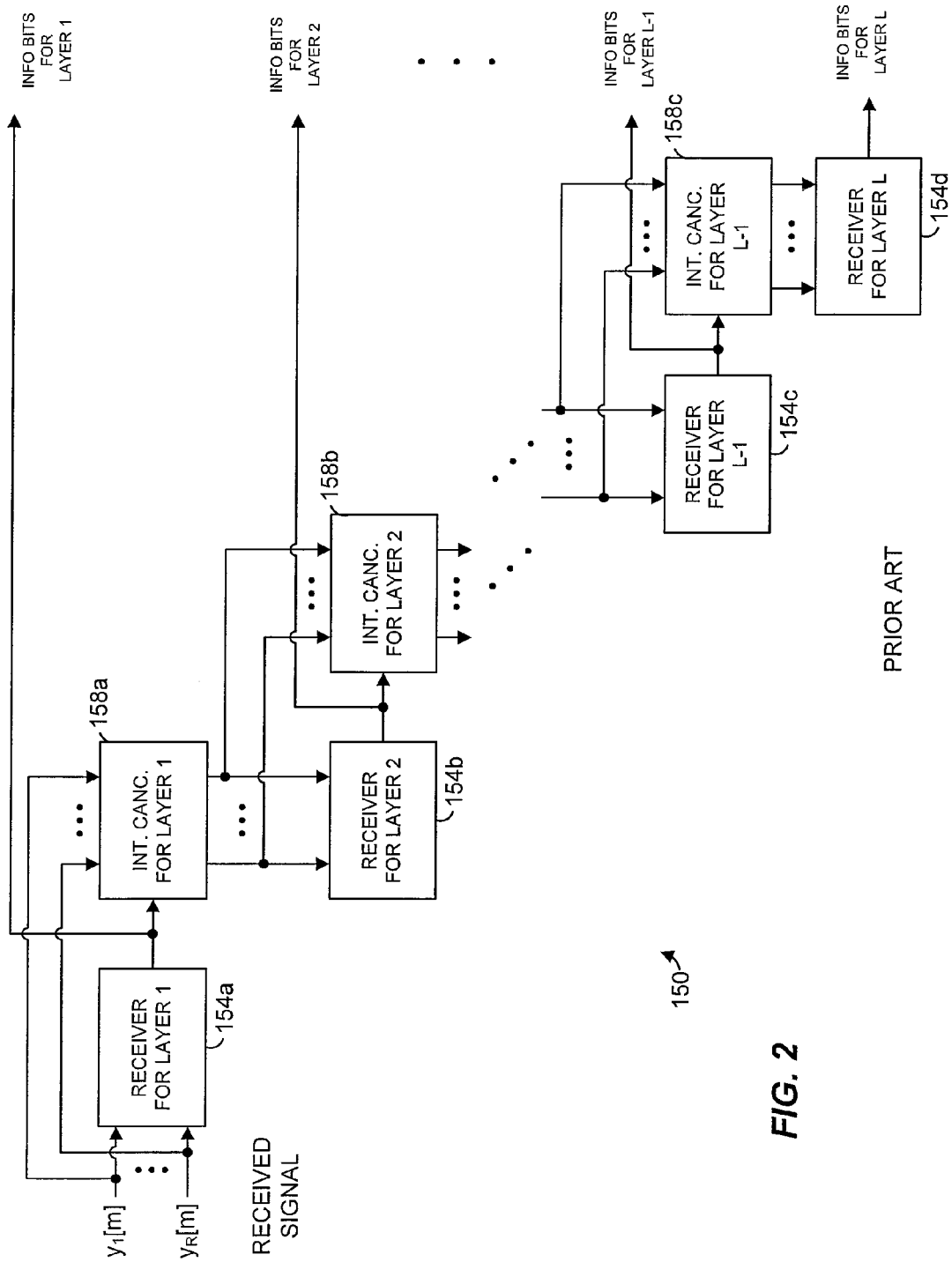
FIG. 2 is a block diagram of a prior art successive interference cancellation receiver.
Figure 3:
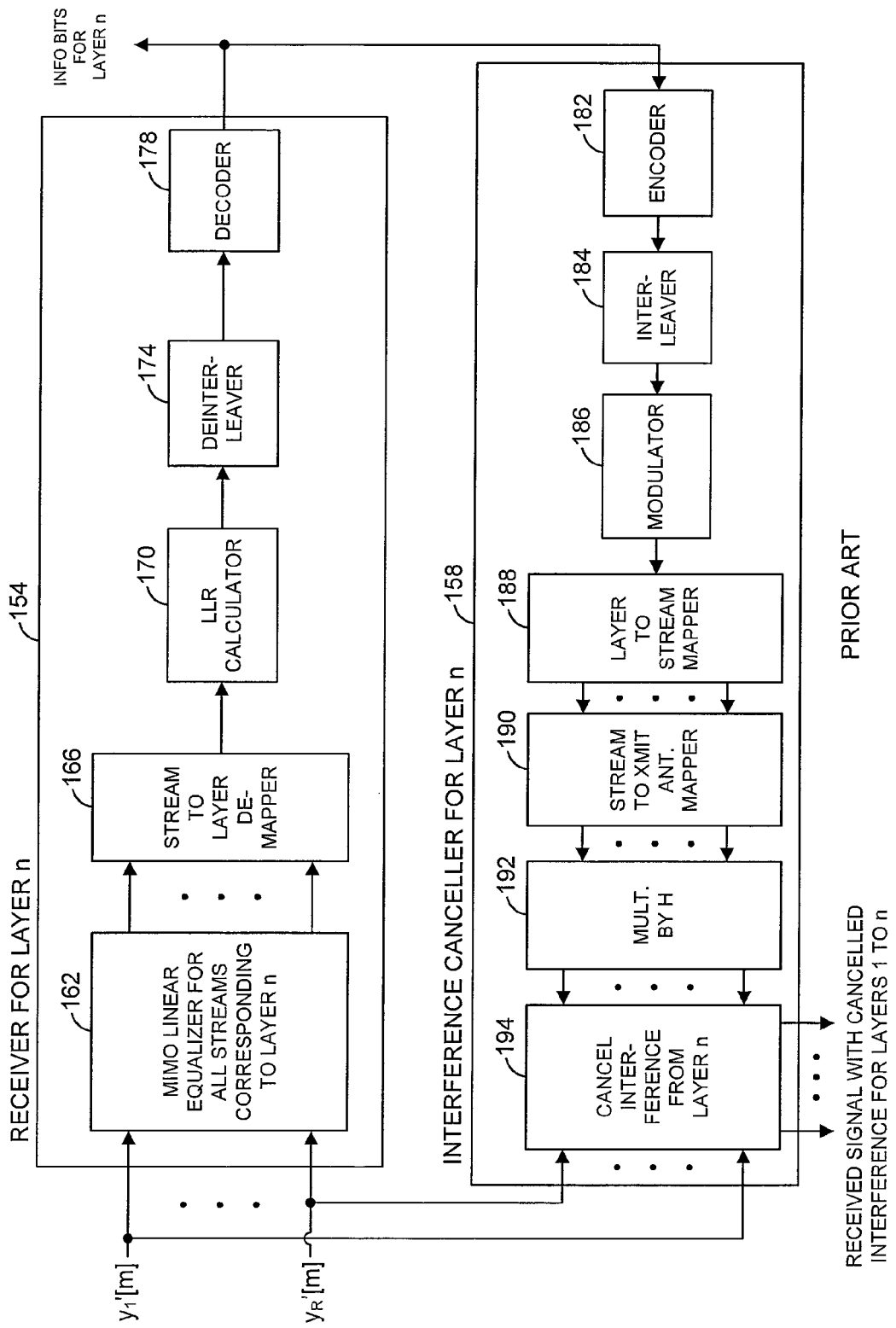
FIG. 3 is a block diagram of a receiver and an interference canceller of the successive interference cancellation receiver of FIG. 2.
Figure 5:
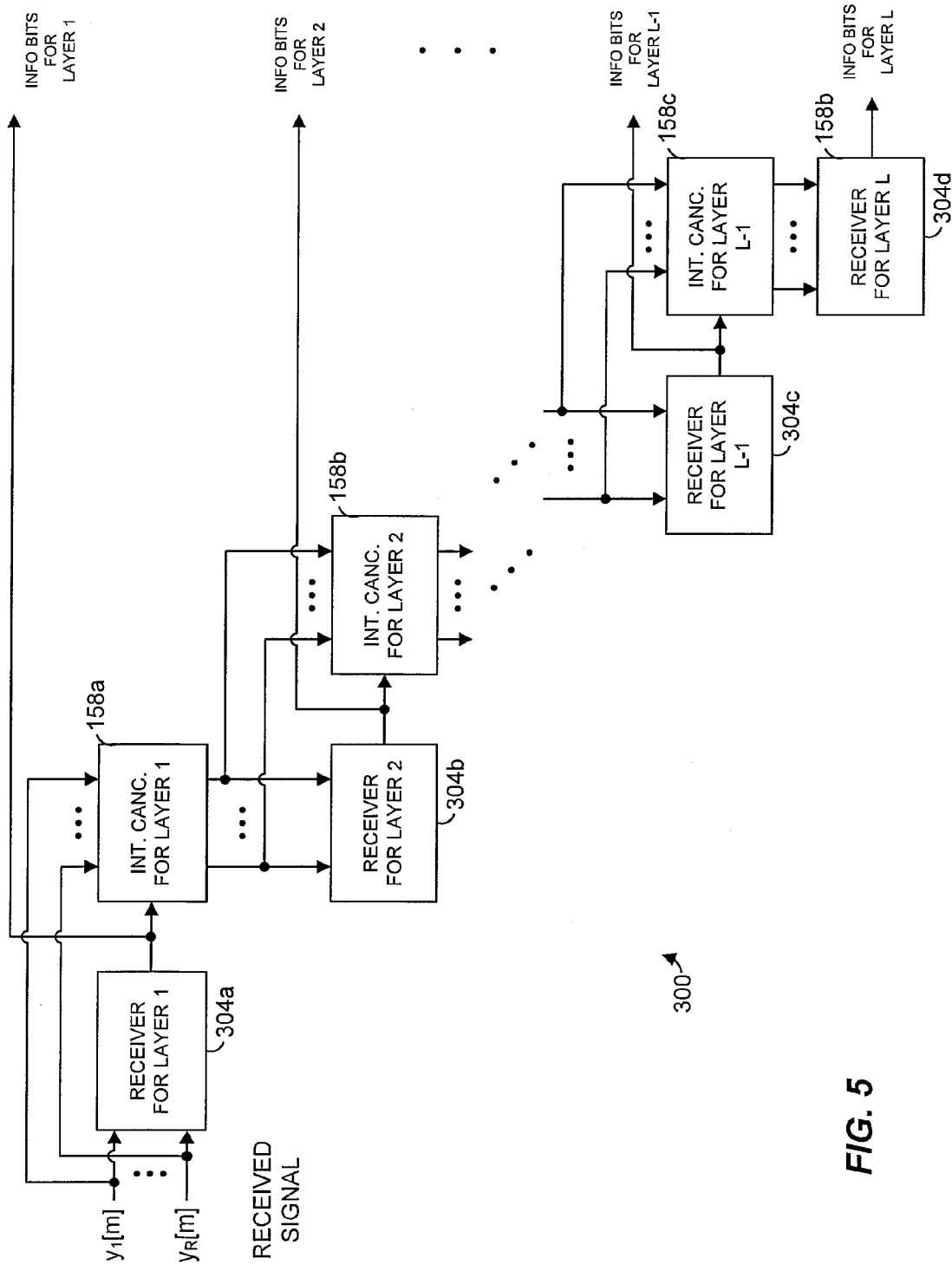
FIG. 5 is a block diagram of an example successive interference cancellation receiver that utilizes MIMO ML techniques.

FIG. 5 is a block diagram of an example successive interference cancellation receiver 300 that can be used in a MIMO communication system having multiple channel encoders, such as a system that can be represented by a model such as the model of FIG. 4. The receiver 300 has a structure similar to the receiver of FIG. 2, and may include the interference cancellers 158 described with reference to FIGS. 2 and 3. It will be understood, however, that the receiver 300 may utilize an interference canceller different than the interference canceler 158.

The MIMO receiver 300 includes L layer receivers 304 and L−1 interference cancellers 158. As will be described in more detail below, each receiver 304 corresponds to a respective one of the L layers. Each receiver is a MIMO maximum likelihood (ML) receiver, and each receiver 304 includes a MIMO ML demodulator. The MIMO ML demodulator generally uses the R signals $y_1[m]$, $y_2[m]$, ..., $y_R[m]$ (i.e., receiver 304a), or the R output signals of an interference canceller 158 (i.e., receivers 304b, 304c, 304d), to generate log likelihood ratio (LLR) values corresponding to the one or more spatial streams that correspond to the layer to which the receiver 304 corresponds. The outputs of the interference cancellers 158 are sometimes referred to herein as modified receive signals. As will be described in more detail below, the MEMO ML demodulator may comprise a soft bit-metric calculator in some embodiments. In other embodiments, the MIMO ML demodulator may comprise a pre-processing block (e.g., for space-time codes) and/or a MIMO equalizer.

The first layer receiver 304a processes the R signals $y_1[m]$, $y_2[m]$, ..., $y_R[m]$ to demodulate and decode the first layer signal. The first layer interference canceller 158a then re-encodes and re-modulates the output of the receiver 304a to estimate the components of $y_1[m]$, $y_2[m]$, ..., $y_R[m]$ due to the first layer information. Then, the interference canceller 158a subtracts the estimated components due to the first layer from $y_1[m]$, $y_2[m]$, ..., $y_R[m]$. Thus, the interference canceller 158a attempts to subtract out the interference of the first layer with respect to layers 2 through L.

The second layer receiver 304b processes the R signals output from the first interference canceller 158a to demodulate and decode the second layer signal. The second layer interference canceller 158b then re-encodes and re-modulates the output of the receiver 304b to estimate the components of $y'_1[m]$, $y'_2[m]$, ..., $y'_R[m]$ due to the second layer information, where $y'_1[m]$, $y'_2[m]$, ..., $y'_R[m]$ are the output of the interference canceller 158a. Then, the interference canceller 158b subtracts the estimated components due to the second layer from the output of the first interference canceller 158a. Thus, the interference canceller 158b attempts to subtract out the interference of the second layer with respect to layers 3 through L. The same technique continues until the L-th layer receiver 304d processes the R signals output from the (L−1)-th interference canceller 158c to demodulate and decode the L-th layer signal.

Figure 6:
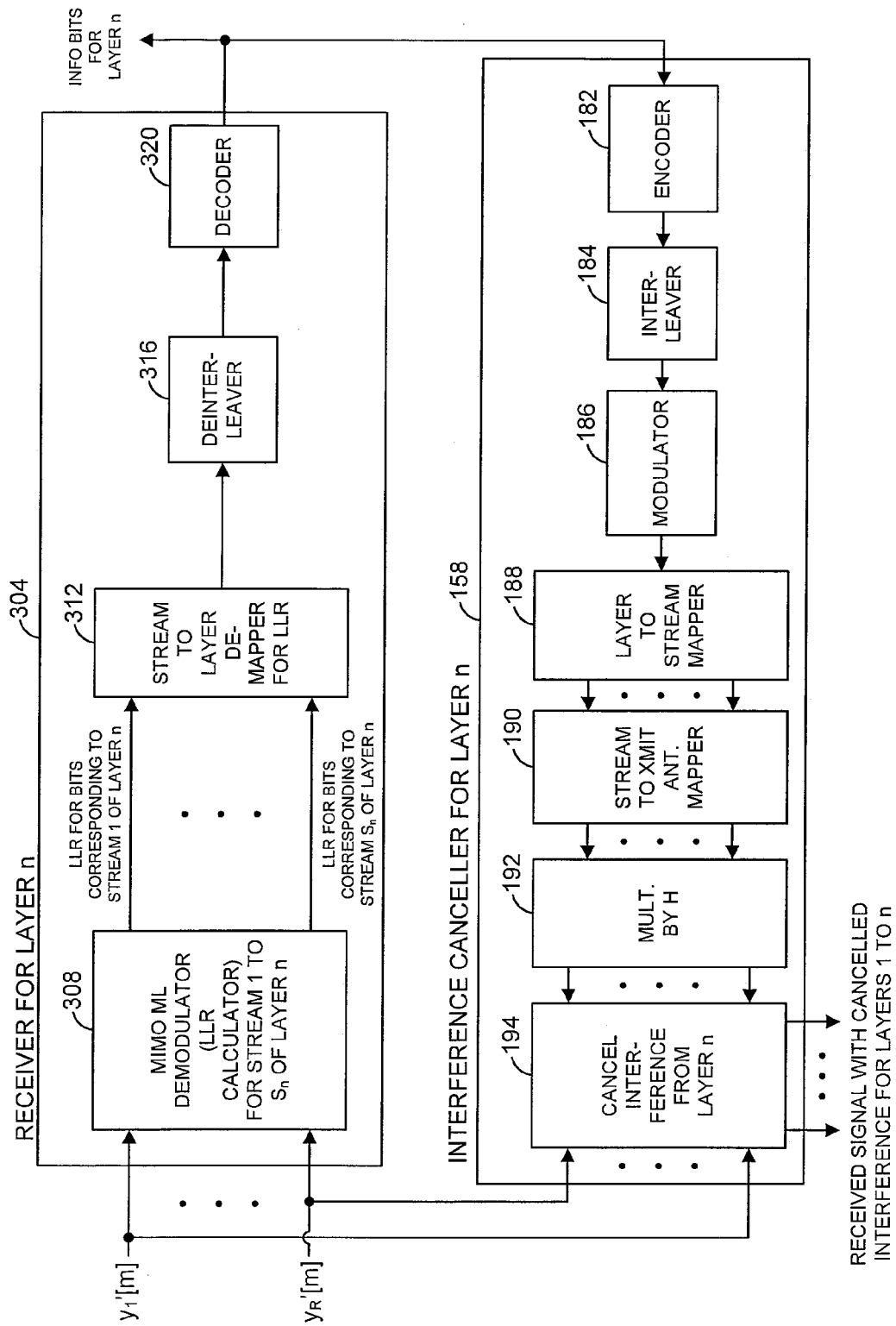
FIG. 6 is a block diagram of an example pair of a MIMO ML receiver and an interference canceller of the successive interference cancellation receiver of FIG. 5.

FIG. 6 is a block diagram of an example layer receiver 304 and layer interference canceller 158 pair for an n-th layer. Both the receiver 304 and the interference canceller 158 receive R signals, either $y_1[m]$, $y_2[m]$, ..., $y_R[m]$ (i.e., the R receive signals if n=1) or $y'_1[m]$, $y'_2[m]$, ..., $y'_R[m]$ (i.e., the R output signals of the previous interference canceller if n>1). The receiver 304 includes a MIMO ML demodulator 308. The MIMO ML demodulator 308 receives the R input signals and generates LLR values for each of the $S_n$ spatial streams corresponding to the n-th layer.

A de-mapper unit 312 receives the $S_n$ output signals from the MIMO ML demodulator 308 and generates a single signal corresponding to the n-th layer. Generally, the de-mapper unit 312 undoes a known mapping function that maps a layer signal to $S_n$ spatial streams performed at a transmitter. The output of the de-mapper unit 312 is a stream of LLR values.

The receiver 304 also includes a deinterleaver 316 and a decoder 320. The deinterleaver 316 reverses a known bit interleaving process performed at the channel encoder for the n-th layer. The decoder 320 generally uses the LLR values to decode the signal into a bit stream corresponding to the n-th layer.

The R signals received by the n-th receiver 304 can be expressed as:

$$y_n = y - \sum_{i=1}^{n-1} H_i \hat{x}_i, \quad \text{(Equation 3)}$$

where $y_n$ is the set of signals received by the receiver 304 corresponding to the n-th layer, and $\hat{x}_i$ is the estimate of the spatial streams corresponding to the i-th layer generated by the interference canceller 158 corresponding to the i-th layer.

Assuming that $\hat{x}_i = x_i$, then Equation 3 can be rewritten as:

$$y_n = \sum_{i=n}^{L} H_i x_i + z, \quad \text{(Equation 4)}$$

Equation 4 can be rewritten as:

$$y_n = H_n x_n + \sum_{i=n+1}^{L} H_i x_i + z, \quad \text{(Equation 5)}$$

Thus, for the LLR calculations of bits corresponding to the spatial streams in layer n, the signals from layers 1 to n−1 may be assumed to be removed and the signals from layers n+1 to L may be considered as interference. Thus, MIMO ML demodulation in the presence of interference can be utilized in one or more of the receivers 304.

Figure 7:
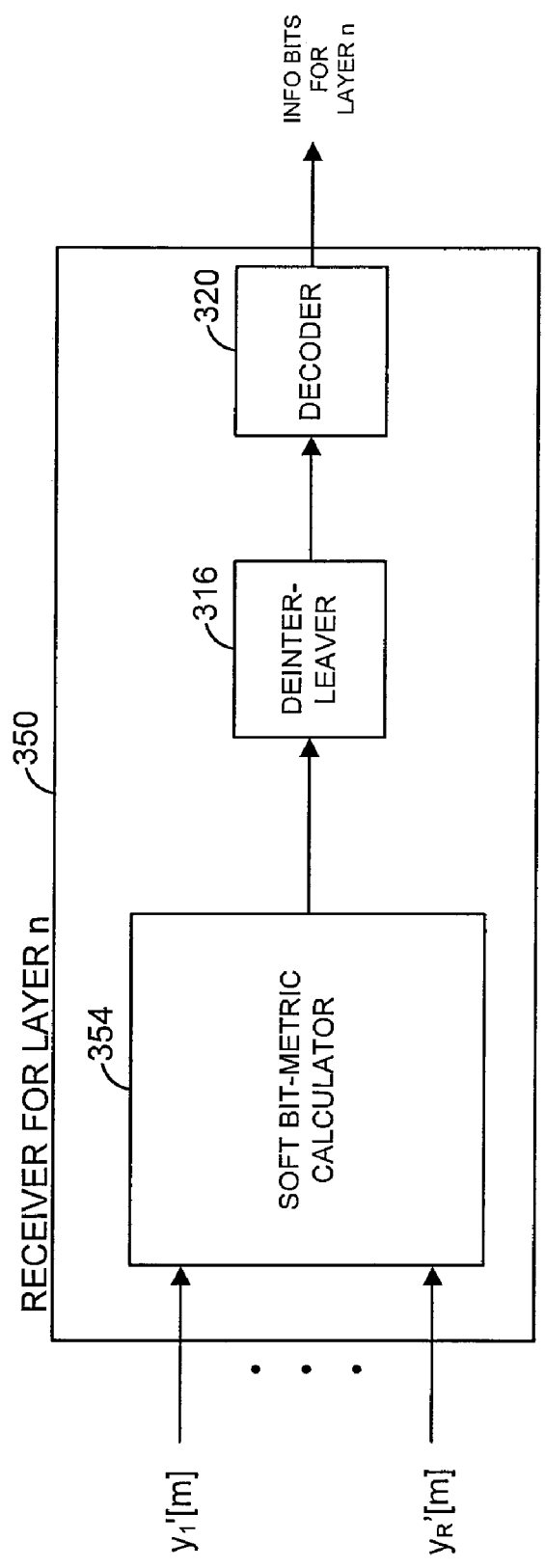
FIG. 7 is a block diagram of an example MIMO ML receiver that may be utilized with the successive interference cancellation receiver of FIG. 5.

If the n-th layer has only one spatial stream, then a receiver such as the example receiver 350 of FIG. 7 may be utilized as the receiver 304 of FIG. 6. Similarly, the receiver 304 of FIG. 6 may be configured to operate as the receiver 350, for example. The receiver 350 generally processes the R receive signals, either $y_1[m]$, $y_2[m]$, ..., $y_R[m]$ (i.e., the R receive signals if n=1) or $y'_1[m]$, $y'_2[m]$, ..., $y'_R[m]$ (i.e., the R output signals of the previous interference canceller if n>1) and obtains an estimate of the originally transmitted information. The receiver 350 includes a soft bit metric calculator 354, the de-interleaver 316, and hard-decision decoder 320. Each of these components may correspond to a channel encoder component at a transmitter and may effectively undo the operation performed by the corresponding transmitter component. Referring now to FIGS. 4 and 7, for example, soft bit metric calculator 354 may correspond to modulator 266 that can demodulate/de-map receive signals according to the same modulation scheme as that used by the modulator 266. De-interleaver 316 may correspond to interleaver 262 and may return the symbol order of the received data into its original order, e.g., the order expected by the decoder 320. The decoder 320 may be a soft-decoder that corresponds to encoder 220, and may perform decoding based on the same error correcting code (e.g., convolutional code) as encoder 258. Thus, the decoder 320 may produce an estimate of the information bits for the n-th layer.

Referring again to the soft bit metric calculator 354 of FIG. 7 in more detail, the soft bit metric calculator 354 may calculate soft information for each bit of information contained within the intended signal. The soft information may be in the form of a log-likelihood ratio (LLR) for each received bit of intended information. Alternatively, the soft information can be proportional to an LLR. The soft bit metric calculator 354 may, for example, calculate an LLR according to:

$$LLR(b_i | y_k) = \log \frac{\Pr(b_i = 0 | y_k)}{\Pr(b_i = 1 | y_k)} \quad \text{(Equation 6)}$$

where $b_i$ is the transmitted bit of the intended information contained within $y_k$ for which the LLR is being calculated. The soft bit metric calculator 354 can obtain a reliable log-likelihood ratio based on Equation 6 by using accurate estimates of the channel information for the intended channel and any interference channels, as well as modulation information for these channels.

To compute the channel information estimate, the receiver 300 (FIG. 5) may, for example, include computational logic (not shown) that is configured to estimate the interference channel gain for each receive antenna and each interfering source. The computational logic may also be configured to compute the intended channel gain for each receive antenna. The computational logic can compute these channel information estimates by analyzing the characteristics of pilot patterns received from one or more transmitters, for example. From the analysis of various pilot patterns, the computational logic can produce an estimate of the interference and/or intended channel gain, for example. The receiver 300 may compute the channel information estimates at any suitable time during operation, such as at power-up, when initially connected to a transmitter, periodically, whenever the pilot sequence is transmitted, etc.

The receiver 300 (FIG. 5) may also include a control information decoder (not shown) to compute the modulation information for an intended source and any interference sources. For example, in a WiMAX system, the receiver 300 may include a downlink map (DL-MAP) decoder that decodes a DL-MAP message received from each base station. From the DL-MAP message, the receiver 300 can retrieve the modulation information. Since a DL-MAP message or other control message may be heavily encoded and may be transmitted using frequency reuse, the receiver may be able to accurately decode the control information from the interfering source even if noise and/or interference prevents receiver 300 from accurately decoding regular data from the interfering source.

Referring again to FIG. 7, the soft bit metric calculator 354 may compute the expected receive signal vector based on substantially all of the signals that can affect the receive signal vector. For example, referring briefly again to FIG. 4, if an interfering source operates with a 4-QAM scheme, the soft bit metric calculator 354 can compute bit metric information with the knowledge that the interference from this interfering source takes on only four possible values (e.g., magnitude of one with four different phases).

The soft bit metric calculator 354 may assume that the noise, z, can be modeled as additive noise (e.g., white Gaussian noise), and can be configured to compute the log-likelihood ratio for bit $b_i$ of the intended information according to:

$$LLR_i = \log \left( \sum_{x_1 \in X_{1,l_i}^{(1)}, \ldots, x_j \in X_j} \exp\left( -\frac{\left\| y_{k_i} - \sum_{j=1}^{J} h_{k_i,j} x_j \right\|^2}{\sigma_z^2} \right) \right) - \quad \text{(Equation 7)}$$

$$\log \left( \sum_{x_1 \in X_{1,l_i}^{(0)}, \ldots, x_j \in X_j} \exp\left( -\frac{\left\| y_{k_i} - \sum_{j=1}^{J} h_{k_i,j} x_j \right\|^2}{\sigma_z^2} \right) \right)$$

In Equation 7, $X_i^{(j)}$ is the set of symbols that have a bit value of j at bit position $b_i$ and $\sigma_z^2$ is the power of the noise. Here, the expression $$\sum_{j=1}^{J} h_{k_i,j} x_j = H_k x_k$$

in both logarithm computations produces an accurate estimate of the expected receive signal vector for each possible transmit vector. This expression is a function of the channel information for each interfering layer and a transmit signal for each interfering layer. Therefore, the expression uses both the channel information estimate (to obtain each $h_{k,j}$) and the modulation information.

It should be understood that Equation 7, and any of the other LLR equations provided below are merely illustrative, and that other LLR equations may be computed by the soft bit metric calculator 354. For example, the soft bit metric calculator 354 can operate using a different equation that is based on a distance between a receive signal vector and one or more expected receive signal vectors. This distance calculation may sometimes be referred to as a "distance metric." The soft bit metric calculator 354 can operate using any suitable distance metric, including but not limited to the distance metric of Equation 7.

Instead of computing Equation 7, in some embodiments, an approximation can be implemented to simplify the complexity of the hardware (e.g., logic) or software. For example, a conventional implementation of the soft bit metric calculator 354 may employ an approximation for computing logarithms, and can instead calculate, $$LLR_{i,approx} = \frac{1}{\sigma_z^2} \left[ \min_{x_1 \in X_{1,l_i}^{(1)}, \ldots, x_j \in X_J} \left\{ \left\| y_{k_i} - \sum_{j=1}^{J} h_{k_i,j} x_j \right\|^2 \right\} - \quad \text{(Equation 8)} \right.$$

$$\left. \min_{x_1 \in X_{1,l_i}^{(0)}, \ldots, x_j \in X_j} \left\{ \left\| y_{k_i} - \sum_{j=1}^{J} h_{k_i,j} x_j \right\|^2 \right\} \right]$$

Note that Equation 8, unlike Equation 7, advantageously does not include potentially resource-intensive exponential or logarithm computations. Moreover, Equation 8 ultimately uses only two possible values of the transmit signal vector (a first value with $b_i=0$ in the first signal component and a second value with $b_i=1$ in the second signal component) to compute the approximate LLR, and not all of the possible values of the transmit signal vector.

The computations of Equation 7 and Equation 8 can be further simplified by altering the squared Euclidean distance calculation. That is, rather than computing the distance metric ("DM"), $$DM = \|y_k - H_k x_k\|^2 \quad \text{(Equation 9)}$$

in Equation 7 and/or Equation 8, the squared distance computation may be altered in a way that does not change the result of the computation. For example, the soft bit metric calculator 354 may compute the distance metric, $$DM = \|U^*_k y_k - U^*_k H_k x_k\|^2 \quad \text{(Equation 10)}$$

in place of the squared Euclidean distances shown in Equations 7 and 8. Here, $U^*_k$ is the inverse of a unitary matrix, $U_k$. Because the multiplication is performed using a unitary matrix, this multiplication does not affect the magnitude of each component, and therefore also does not affect the squared Euclidean distance.

In some embodiments, the unitary matrix may be $Q_k$, which is the unitary matrix that results from the QR decomposition of the channel matrix. In particular, the channel matrix may be decomposed as follows:

$$H_k = Q_k R_k \quad \text{(Equation 11)}$$

where $Q_k$ is an R×J unitary matrix and $R_k$ is a J×J upper triangular matrix, where J is equal to $$S - \sum_{i=1}^{n-1} S_i = \sum_{i=n}^{L} S_i$$

for the n-th layer receiver or L−n+1 when each layer has only one stream. By preprocessing the channel matrix using $Q^*_k$ (e.g., using a preprocessor implemented on receiver 300 (FIG. 5) that is not shown), the Euclidean distance metric may be reduced to $$DM = \|Q^*_k y_k - R_k x_k\|^2 \quad \text{(Equation 12)}$$

for the different possible transmit signal vectors. The critical path in the computation of the Euclidean distance metric is the multiplication of a matrix by the transmit signal vector, since this multiplication can occur for up to every possible value of the transmit signal vector. Therefore, by altering the Euclidean distance metric such that the transmit signal vector is multiplied by an upper triangular matrix instead of a full matrix, the computational complexity of the Euclidean distance metric may be decreased substantially. It should be understood that the use of $Q_k$ as the unitary matrix is merely illustrative, and other suitable unitary matrices may be selected instead.

In general, QR factorization can be applied at the beginning of each layer. The received signal and the channel matrix for layer 1 can be preprocessed by the Q matrix of the channel matrix. In other words, the modified received signal is generated by multiplying Q* with the received signal, and the modified channel matrix is generated by multiplying Q* with the channel matrix, which is equivalent to the R matrix. Then this modified received signal and the modified channel matrix may be used by the receiver for layer 1 block 304a and interference cancellation for layer 1 block 158a in FIG. 5. Next, the output of the interference cancellation for layer 1 block 158a can be similarly preprocessed before it is supplied to the receiver for layer 2 block 304b and the interference cancellation for layer 2 block 158b. In particular, a new channel matrix at layer 2 is first formed by removing the columns corresponding to layer 1 from the modified channel matrix at layer 1. Then, QR factorization can be applied to this new channel matrix at layer 1, and the resulting Q matrix can be used to preprocess the signals before they are applied to the next layer. Similarly, at each stage, QR factorization can be performed, and the interference-cancelled received signal and the channel matrix can be preprocessed. By doing this QR-based preprocessing, the dimension of the received signal and the channel matrix can be reduced further and further at each layer, resulting in increasingly lower computational complexity at each layer.

In some operating scenarios, the strength of interfering signals may be strong compared to that of the intended signal on only a subset of the receive antennas. That is, the signal-to-interference plus noise ratio (SINR) may be different for different receive antennas such that some of the antennas are strongly affected by interfering signals while others are not. A receiver can be configured to compute soft information using only those receive antennas having a SINR with at least a predetermined value (e.g., 2 dB, 5 dB, etc.). For example, if a receiver has three receive antennas and only one antenna has an associated SINR that is high, it may be possible to accurately estimate the intended information using only the signal received on the one antenna. The signals receive on the other two receive antennas with low SINR may be ignored, thereby decreasing the amount and/or complexity of the computations necessary to obtain soft information for the intended information. More particularly, the receiver 350 may compute Equation 7 or Equation 8 to obtain soft information, but can compute these equations using fewer than the R components of the receive and channel vectors. As described in greater detail below, a receiver 350 may adaptively determine a subset of the receive dimensions (e.g., receive antennas) to use when decoding a receive signal vector.

In some operating scenarios, an interfering source may not have a strong effect compared to the intended source and/or other interfering sources. Therefore, the interfering signals with reduced effect may be ignored in calculating the log-likelihood equations of Equation 7 and/or Equation 8. In particular, when computing Equation 7 and/or Equation 8, the receiver 350 may compute fewer total Euclidean distance metrics, because of the decrease in number of total possible transmit signal vectors. Also, the number of computations in each Euclidean distance metric may be decreased, since J is decreased. Therefore, by adaptively decreasing the number of interfering signals, the complexity of computing soft information can be reduced.

In some embodiments, rather than completely ignoring interfering signals when they are adaptively determined to not have a strong effect, these interference signals may instead be modeled as background noise. For example, the receiver 350 can model the interference signal as additive noise, such as white Gaussian noise, and can compute Equation 7 and/or Equation 8 by including the power of the interfering signal with $\sigma_z^2$, the power of the background noise. This way, the complexity of computing soft information can be decreased without completely ignoring the presence of an interfering source.

Further details regarding the above-discussed techniques for implementing the receiver 350, and other techniques that can be used to implement the receiver 350, are disclosed in U.S. patent application Ser. No. 12/171,790, entitled "Co-Channel Interference Cancellation with Multiple Receive Antennas for BICM," filed on Jul. 11, 2008, which is hereby incorporated by reference herein in its entirety.

Referring again to FIG. 6, the receiver 304 alternatively can be implemented using other suitable techniques as well. For example when the n-th layer has more one or more spatial streams, techniques disclosed in U.S. patent application Ser. No. 12/207,350, entitled "MIMO Decoding in the Presence of Various Interfering Sources," filed on Sep. 9, 2008, which is hereby incorporated by reference herein in its entirety, may be used.

Figure 8:
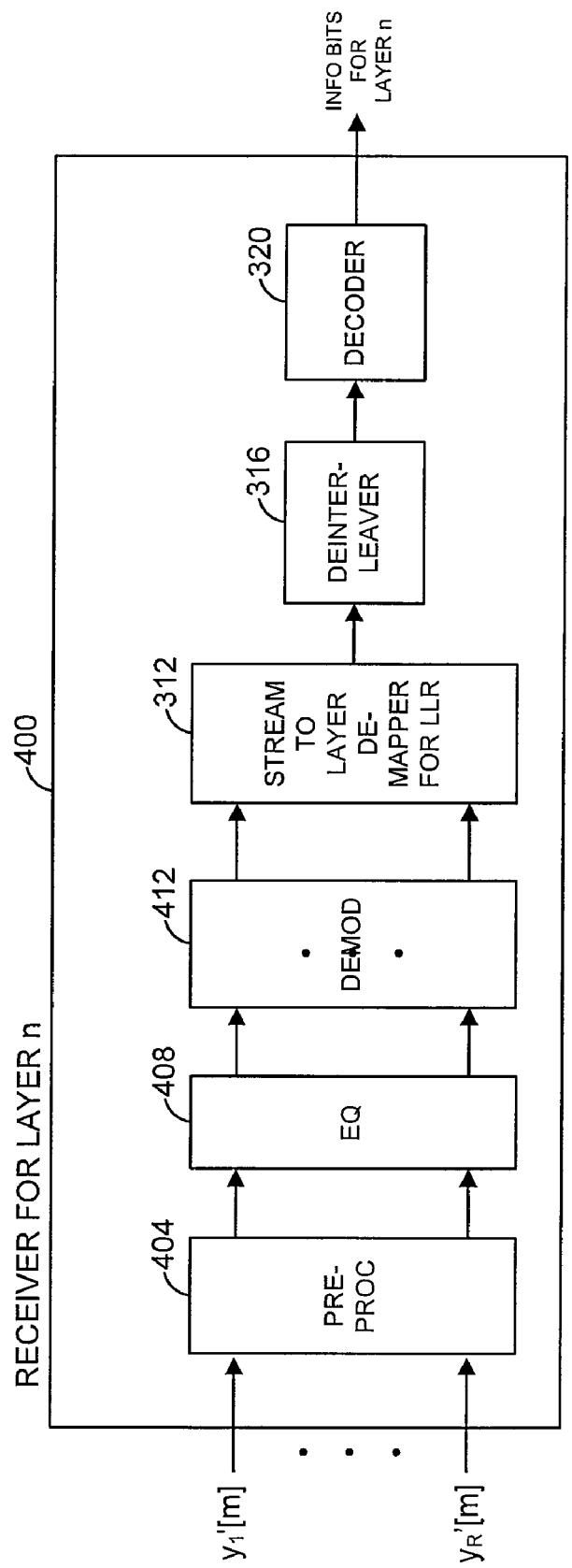
FIG. 8 a block diagram of another example MIMO ML receiver that may be utilized with the successive interference cancellation receiver of FIG. 5.

FIG. 8 is a block diagram of an example receiver 400 that may be used as the receiver 304 in FIGS. 5 and 6. In operation, the receiver 400 may obtain information regarding the one or more interfering signals (i.e., including the interfering signals from layers n+1 to L) in a wired or wireless manner. For example, if the interfering signals include signals sent from a different transmitter than the transmitter sending the layer n signals, and if the receiver 400 (or the communication device in which the receiver 400 is included) is communicatively coupled to the other transmitter(s) via a wired or wireless network, the receiver 400 may receive from the other transmitter(s) such information as modulation schemes, MIMO mode, etc. and, based on the received information. The receiver 400, or another device coupled to the receiver 400, may estimate a set of parameters to generate a channel model discussed in more detail below.

For instance, the receiver 400 may be included in a base station communicatively coupled to other base stations via a wired network backbone (not shown). The multiple base stations may each support multiple mobile stations communicating, for example, according to an OFDMA scheme configured optionally to use the same frequency band. By using any suitable network communication protocol, the base stations may exchange such information as modulation schemes, MIMO mode, etc. and, based on the received information, estimate a set of parameters to generate a channel model. To continue with this example, the mobile stations operating in the cells supported by the other base stations may be significant sources of interference for the receiver 400 during receiving and decoding of the intended streams from one or more mobile stations operating in the cell corresponding to the receiver 400. Of course, if the base stations do not switch between the transmit and receive modes in a synchronized manner, the signals from the other base stations may create additional interference for the receiver 400.

Additionally or alternatively, the receiver 400, or another device coupled to the receiver 400, may estimate channel information due to the interfering signals by processing unique PN sequences corresponding to the interfering signals and known to the receiver 400. For example, the PN sequences may correspond to neighboring base stations or mobile devices communication with the neighbor base stations, and could be received from the neighbor base stations. As yet another alternative, the receiver 400, or another device coupled to the receiver 400, may store at least some of the information necessary for estimating the interfering channel as part of configuration data. Thus, when the receiver 400 is included in a base station, the receiver 400, or another device coupled to the receiver 400, may estimate the uplink channel as a set of both the intended streams and the interfering streams based on the information received via a wired backbone, a wireless network, etc.

On the other hand, when the receiver 400 is included in a mobile station, the receiver 400, or another device coupled to the receiver 400, may estimate the downlink channel, including both the parameters related to the intended streams and to the interfering streams, based on wireless signals only. As one example, a mobile station operating in a WiMAX network may estimate the portion of the channel related to the interfering sources from a Downlink Map (DL-MAP) message broadcast by the adjacent base stations using the same carrier frequency as the frequency on which the mobile station receives the one or more intended streams. As is known, the DL-MAP message specifies the allocation of resources (i.e., carrier frequencies, timeslots, etc.) in the OFDMA scheme. Thus, by processing DL-MAP messages from one or several adjacent base stations in addition to the base station with which the mobile station is currently communicating, the mobile station can obtain a set of parameters that may be used for constructing the channel model discussed below. Further, a mobile station may obtain these or additional channel parameters from the periodic broadcasts of PN sequences, similarly to processing of PN sequences at a base station discussed above.

The receiver 400 may decode the received signals in accordance with the model discussed above. In particular, in order to separate the intended signals from the interference signals, the receiver 400 may pre-process the input signals using a pre-processor 404, such as a pre-processor for space-time code, optionally equalize the received signals in a MIMO equalizer 408, and demodulate the received signals in a demodulator 412.

If non-space-time-encoded signals are utilized, the pre-processor 404 may be omitted, or the receiver 400 may bypass the pre-processor 404. In general, the MIMO equalization module 408 may implement any suitable MIMO equalization techniques, including those currently known in the art. For example, the MIMO equalization module 408 may operate as a zero-forcing (ZF) linear equalizer (LE), a minimum mean square error liner equalizer (MMSE LE), a ZF decision feedback equalizer (DFE), an MMSE DFE, etc. A more specific example will be described for explanatory purposes in which the number of receive antennas is two, the number of spatial streams in layer n is two, and the number of spatial streams in layers n+1 to L is two. Accordingly, in this specific example, the input to the receiver 400 can be expressed as:

$$\begin{bmatrix} y'_1 \\ y'_2 \end{bmatrix} = \begin{bmatrix} h_{1,1} & h_{1,2} & h_{1,3} & h_{1,4} \\ h_{2,1} & h_{2,2} & h_{2,3} & h_{2,4} \end{bmatrix} \begin{bmatrix} x_1 \\ x_2 \\ x_3 \\ x_4 \end{bmatrix} + \begin{bmatrix} z_1 \\ z_2 \end{bmatrix} \quad \text{(Equation 13)}$$

the receiver 400 may work with an equalized model $$\tilde{y} = \tilde{H}x + \tilde{z} \quad \text{(Equation 14)}$$

$$\begin{bmatrix} \tilde{y}_1 \\ \tilde{y}_2 \end{bmatrix} = \begin{bmatrix} 1 & 0 & \tilde{h}_{1,3} & \tilde{h}_{1,4} \\ 0 & 1 & \tilde{h}_{2,3} & \tilde{h}_{2,4} \end{bmatrix} \begin{bmatrix} x_1 \\ x_2 \\ x_3 \\ x_4 \end{bmatrix} + \begin{bmatrix} \tilde{z}_1 \\ \tilde{z}_2 \end{bmatrix} \quad \text{(Equation 15)}$$

It is apparent that the equalized channel matrix $\tilde{H}$ forces $x_2$ and $x_1$ to zero when calculating $\tilde{y}_1$ and $\tilde{y}_2$, respectively, thereby canceling the mutual impact of the intended streams.

To continue with this example, the demodulator 412 may next estimate each received symbol by using the log-likelihood ratio (LLR) approach. In operation, the demodulator 412 may calculate the LLR value for the i-th symbol in the first intended stream $x_1$ by applying the formula $$LLR_{1,I} = \log\left(\sum_{x \in X_{1,I}^{(1)}} \exp\left(\frac{|\tilde{y}_1 - \tilde{h}_{row,1}x|^2}{\sigma_{\tilde{z}_1}^2}\right)\right) - \log\left(\sum_{x \in X_{1,I}^{(0)}} \exp\left(\frac{|\tilde{y}_1 - \tilde{h}_{row,1}x|^2}{\sigma_{\tilde{z}_1}^2}\right)\right),$$ (Equation 16)

where $\tilde{h}_{row,r}$ is r-th row of $\tilde{H}$ and $X_{s,I}^{(b)}$ is a set of vectors of signal constellation points whose value in the I-th symbol position of the s-th element is equal to b, and where σ is variance of the noise.

In another embodiment or when operating in a different mode, the receiver 400 may directly proceed to calculating LLR values in the demodulator 412 without performing MIMO equalization in the module 408 if the incoming data is non-space-time encoded. In other words, the receiver 400 may not generate an equivalent model and may instead use the more computationally complicated model y=Hx+z to calculate maximum-likelihood (ML) LLR values:

$$LLR_{s,I} = \log\left(\sum_{x \in X_{s,I}^{(1)}} \exp\left(\frac{\|y - Hx\|^2}{\sigma_z^2}\right)\right) - \log\left(\sum_{x \in X_{s,I}^{(0)}} \exp\left(\frac{\|y - Hx\|^2}{\sigma_z^2}\right)\right).$$ (Equation 17)

When calculating LLR values without a prior MIMO equalization, the demodulator 412 or another component of the receiver 400 may also simplify the computation based on max-log-map approximation. As another alternative, the receiver 400 may reduce the complexity of equalization-free LLR computation by decomposing the matrix H into an orthogonal and a triangular matrix (e.g., by performing the known technique of QR decomposition). If a certain embodiment of the receiver 400 relies on QR decomposition, the demodulator 412 may work with Q*y and R rather than with y and H, where * denotes a complex conjugate.

In another embodiment, linear filtering on the received signal or the modified received signal may be performed to reduce the dimension of the received signal (or modified received signal) to less than R, but equal to or larger than S. Then, techniques such as described above can be performed on the reduced dimension signals, i.e., as if the number of antennas is reduced.

Further details regarding the above-discussed techniques for implementing the receiver 400, and other techniques that can be used to implement the receiver 400, are disclosed in U.S. patent application Ser. No. 12/207,350.

Referring again to FIG. 4, all of the channel encoders 254 may be included in a single transmitter (e.g., a base station), or the channel encoders 254 may be distributed amongst multiple transmitters (e.g., as in the uplink of a cellular system). In either situation, a single successive interference cancellation receiver such as in FIG. 5 may be utilized to decode all L layers.

Similarly, subsets of the L layers may be intended for different receivers. In this situation, each receiver may be similar to the successive interference cancellation receiver of FIG. 5, but omit processing for at least some layers that are not intended for the receiver.

Also, the order in which the layers are processed by the successive interference cancellation receiver may be ordered to improve performance, for example, and any suitable ordering scheme may be utilized. For instance, the ordering may be based on the SINR of the signals of the different layers. For instance, the first layer may be selected as the layer having the best SINR, the second layer may be selected as the layer having the second best SINR, etc. As another example, the first layer may be selected as the layer having the best SINR. Then, SINR for the remaining layers may be recalculated after interference due to the first layer has been subtracted out. Then, the second layer may be selected as the layer having the best recalculated SINR, and so on.

At least some of the various blocks, operations, and techniques described above may be implemented in hardware, firmware, software, or any combination of hardware, firmware, and/or software. When implemented in software or firmware, the software or firmware may be stored in any computer readable memory such as on a magnetic disk, an optical disk, or other storage medium, in a RAM or ROM or flash memory, processor, hard disk drive, optical disk drive, tape drive, etc. Likewise, the software or firmware may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware may include machine readable instructions that are capable of causing one or more processors to perform various acts.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A method of decoding a plurality of information streams corresponding to a plurality of layers, the plurality of information streams transmitted via a multiple input multiple output (MIMO) communication channel, the method comprising:
    performing a first matrix decomposition on a channel matrix;
    preprocessing a plurality of received signals with information from the first matrix decomposition;

preprocessing the channel matrix with information from the first matrix decomposition to generate a first modified channel matrix;

processing the plurality of received signals to decode information corresponding to a first layer transmitted via at least one first spatial stream;

generating a plurality of modified received signals using (i) the decoded information corresponding to the first layer and the plurality of received signals and (ii) the first modified channel matrix;

performing a second matrix decomposition on the first modified channel matrix;

preprocessing the plurality of modified received signals with information from the second matrix decomposition;

processing the first modified channel matrix with information from the second matrix decomposition to generate a second modified channel matrix;

generating bit metric values for a second layer using MIMO maximum likelihood (ML) demodulation and using (i) the plurality of modified received signals and (ii) channel and modulation information for interfering signals including the second modified channel matrix, wherein the second layer is transmitted via at least one second spatial stream; and decoding information corresponding to the second layer using the generated bit metric values.

2. A method according to claim 1, wherein generating the bit metric values for the second layer comprises generating bit metric values corresponding to only one spatial stream.

3. A method according to claim 1, wherein generating the bit metric values for the second layer comprises generating bit metric values corresponding to a plurality of spatial streams.

4. A method according to claim 3, further comprising de-mapping the plurality of spatial streams to a single stream of bit metric values prior to decoding.

5. A method according to claim 1, further comprising de-interleaving the bit metric values prior to decoding.

6. A method according to claim 1, further comprising preprocessing the plurality of modified received signals for space-time coding.

7. A method according to claim 1, further comprising equalizing the plurality of modified received signals using a MIMO equalizer.

8. A method according to claim 1, wherein the bit metric values are log likelihood ratios.

9. A successive interference cancellation receiver for receiving a plurality of information streams transmitted via a multiple input multiple output (MIMO) communication channel, the plurality of information streams corresponding to a plurality of layers, the successive interference cancellation receiver comprising:

a first layer receiver to demodulate and decode a plurality of received signals to decode information corresponding to a first layer transmitted via at least one first spatial stream, wherein the first layer receiver is configured to perform a first matrix decomposition on a channel matrix, preprocess the plurality of received signals with information from the first matrix decomposition, and preprocess the channel matrix with information from the first matrix decomposition to generate a first modified channel matrix;

an interference canceller to cancel interference due to the first layer from the plurality of received signals to generate a plurality of modified received signals, wherein the interference canceller is configured to use the first modified channel matrix to generate the plurality of modified received signals;

a second layer receiver to demodulate and decode the plurality of modified received signals to decode information corresponding to a second layer, wherein (i) the second layer is transmitted via at least one second spatial stream, (ii) the second layer receiver is configured to perform a second matrix decomposition on the first modified channel matrix, preprocess the plurality of modified received signals with information from the second matrix decomposition, and process the first modified channel matrix with information from the second matrix decomposition to generate a second modified channel matrix, and (ii) (iii) the second receiver includes:

a MIMO maximum likelihood (ML) demodulator to generate bit metric values for the second layer using (i) the plurality of modified received signals and (ii) channel and modulation information for interfering signals including the second modified channel matrix, and a decoder to generate information corresponding to the second layer using the bit metric values.

10. A successive interference cancellation receiver according to claim 9, wherein the second layer receiver further includes a pre-processor for space-time coding.

11. A successive interference cancellation receiver according to claim 9, wherein the second layer receiver further includes a MIMO equalizer.

12. A successive interference cancellation receiver according to claim 9, wherein the second layer receiver further includes a spatial stream de-mapper to de-map the bit metric values.

13. A successive interference cancellation receiver according to claim 9, wherein the second layer receiver further includes a deinterleaver to deinterleave the bit metric values.

14. A successive interference cancellation receiver according to claim 9, wherein the first layer receiver includes:

a MIMO ML demodulator to generate bit metric values for the first layer using (i) the plurality of received signals and (ii) channel and modulation information for interfering signals including the first modified channel matrix; and a decoder to generate the information corresponding to the first layer using the bit metric values generated by the MIMO ML demodulator of the first receiver.

15. A successive interference cancellation receiver according to claim 9, wherein the bit metric values are log likelihood ratios.

16. A successive interference cancellation receiver for receiving a plurality of information streams transmitted via a multiple input multiple output (MIMO) communication channel, the plurality of information streams corresponding to a plurality of layers, the successive interference cancellation receiver comprising:

a plurality of layer receivers, each layer receiver to demodulate and decode a respective plurality of input signals to obtain information corresponding to a respective one of the plurality of layers, wherein each layer in the plurality of layers is transmitted via at least one respective spatial stream;

one or more interference cancellers, each interference canceller of the one or more interference cancellers to receive an output from a respective one of the plurality of layer receivers and to cancel interference from the plurality of input signals to the respective one of the plurality of layer receivers, the interference due to a respective one of the plurality of layers;
wherein at least one of the plurality of layer receivers comprises:
a MIMO maximum likelihood (ML) demodulator to generate bit metric values for the respective layer using a plurality of signals generated from a first interference canceller of the one or more interference cancellers and channel and modulation information for interfering signals; and
a decoder to generate information corresponding to the respective layer using the bit metric values.

17. A successive interference cancellation receiver according to claim 16, wherein another one of the plurality of layer receivers comprises:
a MIMO ML demodulator to generate bit metric values for the corresponding layer using a plurality of received signals and channel and modulation information for interfering signals; and
a decoder to generate information corresponding to the respective layer using the bit metric values.

18. A successive interference cancellation receiver according to claim 16, wherein the at least one layer receiver further includes a pre-processor for space-time coding.

19. A successive interference cancellation receiver according to claim 16, wherein the at least one layer receiver further includes a MIMO equalizer.

20. A successive interference cancellation receiver according to claim 16, wherein the at least one layer receiver further includes a spatial stream de-mapper to de-map the bit metric values.

21. A successive interference cancellation receiver according to claim 16, wherein the at least one layer receiver further includes a deinterleaver to deinterleave the bit metric values.

* * * * *